United States Patent
Mathes et al.

(10) Patent No.: US 7,403,275 B2
(45) Date of Patent: Jul. 22, 2008

(54) OPTICAL REFLECTOMETRY USING INTEGRATED VCSEL PHOTODIODE CHIP

(75) Inventors: David T. Mathes, Garland, TX (US); James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/566,964

(22) Filed: Dec. 5, 2006

(65) Prior Publication Data

US 2008/0129983 A1 Jun. 5, 2008

(51) Int. Cl.
*G01N 21/00* (2006.01)

(52) U.S. Cl. .................................... 356/73.1

(58) Field of Classification Search ........................ None
See application file for complete search history.

(56) References Cited

U.S. PATENT DOCUMENTS 7,218,388 B1 * 5/2007 Keeler et al. ............... 356/73.1

OTHER PUBLICATIONS

Passy, R., et al., "Experimental and Theoretical Investigations of Coherent OFDR with Semiconductor Laser Sources" Journal of Lightwave Technology, vol. 12, No. 9, Sep. 1994, pp. 1622-1630.
Derickson, Dennis, et al., "Fiber Optic Test and Measurement", 1998 Hewlett-Packard Company, Optical Reflectometry for Component Characterization Chap. 10, pp. 420-431.

* cited by examiner

*Primary Examiner*—Tu T Nguyen
(74) *Attorney, Agent, or Firm*—Workman Nydegger

(57) ABSTRACT

Optical time domain and frequency domain reflectometry using a VCSEL-photodiode combination. Optical time domain reflectometry can be accomplished using an integrated VCSEL-Photodiode. A pulse is emitted by the VCSEL and a reflection caused by an occurrence of interest along an optical waveguide is detected by the photodiode. The time between when the pulse is emitted and when the reflection is received can be used to determine a distance to the occurrence of interest. In Optical frequency domain applications, a VCSEL is wavelength modulated. An occurrence of interest will affect the output of the VCSEL. The affected output is detected and used to determine a distance to the occurrence of interest.

16 Claims, 2 Drawing Sheets

OPTICAL REFLECTOMETRY USING INTEGRATED VCSEL PHOTODIODE CHIP

BACKGROUND OF THE INVENTION

1. The Field of the Invention

The invention generally relates to optical reflectometry. More specifically, the invention relates to simplifying apparatuses and methods used in optical reflectometry.

2. Description of the Related Art

Modern day computer networks allow for transmissions of large amounts of data between computer terminals. Data may be transmitted on a network across a number of different mediums. For example, data may be transmitted across traditional copper wire based cables. However, copper wire based cables are subject to limitations that are making them less attractive as a solution for many modern networks. Specifically, the copper wire based cables are limited in the amount of data they can carry in a given time period and the length that the data can travel. As computer technology continues to increase in the amount of data that can be produced in a given time period, other types of cable with higher capacities and longer transmission distances may be desirable.

One type of cable that is capable of higher data transmission rates over longer distances is fiber-optic cable. Fiber-optic cables are plastic or stretched glass cables that carry data signals in the form of light. Light signals can propagate on fiber-optic cables at higher speeds and for longer distances than electronic signals on copper wire based cables. Further, fiber-optic cables are potentially lighter weight and less expensive that their copper based counterparts. Thus, fiber-optic cables are steadily becoming a more popular choice for communication networks.

While fiber-optic data signal are optical or light signals, data signals at computer terminals generally continue to be electronic data signals. The electronic data signals being sent by a computer terminal are therefore converted using an electro-optical transducer, such as a laser diode or light emitting diode (LED) that converts the electronic data signals to corresponding optical data signals. To receive a signal from a fiber-optic network, a computer terminal converts the optical data signal to a corresponding electronic signal using an opto-electronic transducer, such as a photodiode and post-amplifier.

Fiber-optic cables or optical fibers are one type of optical waveguide. An optical fiber, or other waveguide, may have various occurrences along the length of the fiber that affect the performance of the fiber. For example, various defects, cracks, breaks, bends, and the like may exist along the length of the fiber. Each of these occurrences can degrade the performance of the waveguide by causing reflections which reduces total power and causes harmful interference. Other occurrences such as connectors and joints can also cause harmful reflections.

It is often useful to be able to detect occurrences along the length of an optical waveguide. This can be done using optical reflectometry. Optical reflectometry involves sending an optical signal from a discrete optical source, such as a VCSEL, onto a waveguide and detecting reflections caused by occurrences using a separate discrete optical detector, such as a photodiode. To accomplish this, a fairly complicated arrangement of optical components is used. An exemplary prior art example of an optical reflectometry apparatus is illustrated in FIG. 1. FIG. 1 illustrates a laser 102 that emits an optical signal. The optical signal optionally is passed through an isolator 104, a fiber coupler 106, and a beam splitter 108 where it is propagated onto a fiber 110. Occurrences associated with the optical fiber 110, such as defects in the fiber, breaks in the fiber, bends in the fiber, connections to the fiber, etc., cause reflections back towards the beam splitter 108. The beam splitter 108 causes a portion of the reflection to be directed back towards the laser 102, and a portion to be directed through a fiber coupler 112 to a detector 114, such as a photodiode. Notably, the laser 102 and detector 114 each function as individual systems performing a specific task and are intentionally isolated from one another through the combination of the beam splitter 108 and the isolator 104 which prevents reflections from reaching the laser 102.

The number of components used in present optical reflectometry applications has an adverse effect on the cost and size of meters and equipment used optical waveguide evaluations. As such, a simpler, more cost effective solution would be desirable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In one embodiment, a method of testing an optical waveguide to determine a distance in the optical waveguide of an occurrence of interest is illustrated. The method includes a VCSEL emitting a wavelength modulated optical signal into a waveguide. A reflection of the wavelength modulated optical signal is also received at the VCSEL. The reflection is caused by an occurrence of interest affecting the waveguide at a particular wavelength. The reflection received at the VCSEL causes a change in the VCSEL output. The change in the VCSEL output is detected. The change in VCSEL output is correlated to a distance in the waveguide. The distance is, at least approximately, a distance to the occurrence of interest.

In another embodiment, at a VCSEL, an optical pulse is emitted into a waveguide. At a photodiode disposed in the same epitaxial structure as the VCSEL, a reflection of the pulse is received. The reflection of the pulse passes through the VCSEL and onto the photodiode. The reflection is caused by an occurrence of interest affecting the waveguide. The amount of time between when the pulse was emitted and when the reflection was received is measured. The amount of time is correlated to a distance in the waveguide. The distance is, at least approximately, a distance to the occurrence of interest.

Another embodiment is directed to a test apparatus configured to test for occurrences of interest along an optical waveguide. The test apparatus includes a VCSEL. A pulse generator is connected to the VCSEL. The pulse generator is configured to cause the VCSEL to emit an optical pulse into a waveguide. A photodiode disposed in the same epitaxial structure as the VCSEL. A timer is communicatively coupled to the VCSEL and the photodiode. The timer is configured to measure an amount of time between when a pulse is emitted by the VCSEL and when a reflection of the pulse passes through the VCSEL and onto the photodiode. The reflection is caused by an occurrence of interest affecting the waveguide is received.

These and other features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
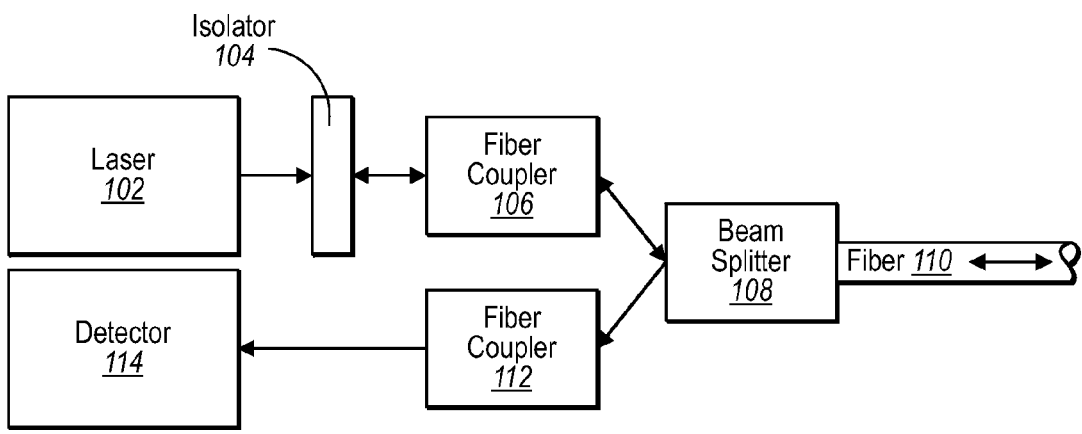
FIG. 1 illustrates a prior art optical reflectometry application.
Figure 2:
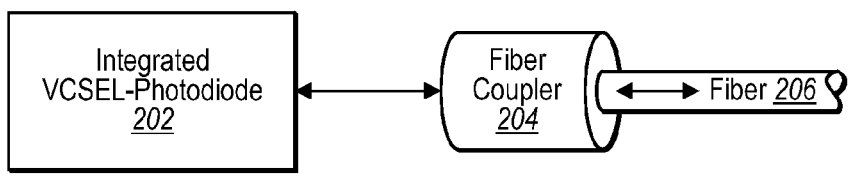
FIG. 2 illustrates an optical reflectometry application using an integrated VCSEL-Photodiode.

One embodiment illustrated herein uses an integrated Vertical Cavity Surface Emitting Laser (VCSEL)-Photodiode chip such as is used in optical velocimetry applications. The integrated chip may include a VCSEL and photodiode formed from a common epitaxial structure, with the VCSEL and photodiode disposed one atop the other and sharing an axis, which may be the same as the axis of a fiber coupler. In particular, the integrated chip may be used for one or both of Optical Time Domain Reflectometry (OTDR) or Optical Frequency Domain Reflectometry (OFDR). FIG. 2 illustrates an example of a configuration for reflectometry equipment using an integrated VCSEL-Photodiode 202. In contrast to the prior art system illustrated in FIG. 1, the present embodiment eliminates the large number of optical components in favor of a system using the integrated VCSEL-Photodiode 202 and a single fiber coupler 204 which connects the VCSEL-Photodiode 202 to an optical waveguide such as the fiber 206 illustrated in FIG. 2.

In OTDR applications, a pulse is emitted by the VCSEL portion of the VCSEL-Photodiode 202. The pulse travels through the fiber coupler 204 and is propagated onto the fiber 206. All or a portion of the pulse may be reflected by an occurrence along the fiber 206. The reflection is received by the Photodiode portion of the VCSEL-Photodiode. Timing circuitry can be used to calculate the time from when a pulse is emitted to when a reflection is received. By knowing the wavelength of the pulse and some characteristics of the fiber 206, a calculation can be performed to calculate a distance on the fiber 206 to approximate or determine exactly where the occurrence exists along the length of the fiber 206. OTDR applications of the VCSEL-Photodiode may be suitable for use with fibers sufficiently long enough and/or with occurrences located at a sufficient distance to allow ringing that may occur at the VCSEL-Photodiode, caused by emitting a pulse, to die out before the reflection is received. More detailed examples of OTDR applications will be explained below.

In OFDR applications, the wavelength of the VCSEL in the VCSEL-Photodiode 202 is modulated, and the modulated optical output is propagated through the fiber coupler 204 onto the fiber 206. An occurrence along the length of the fiber 206 causes a reflection back towards the VCSEL-Photodiode 202 and effectively becomes part of the external cavity. The reflection re-enters the cavity of the VCSEL and causes a change in the output of the VCSEL. The change is detected by the photodiode portion of the VCSEL-Photodiode 202. The change in output, along with information about the wavelength modulation can be used to determine a distance on the fiber 206 where the occurrence exists. OFDR applications using the VCSEL-Photodiode 202 may be suitable for shorter length fibers or for occurrences located at shorter distances on the fiber.

Because of the similarity of the configurations for OTDR and OFDR using the VCSEL-Photodiode 202, a test apparatus may be implemented without inordinate amounts of redundant circuitry which allows both forms of testing to be performed using, for the most part, the same optical components. Additionally, methods may be performed where a single fiber can be quickly tested using both OTDR and OFDR such that the most relevant data can be obtained. Additionally, while the OTDR and OFDR applications are shown using the integrated VCSEL-Photodiode, other embodiments, especially in the case of OFDR, may nonetheless be implemented with discrete components within the scope of the invention.

Figure 3A:
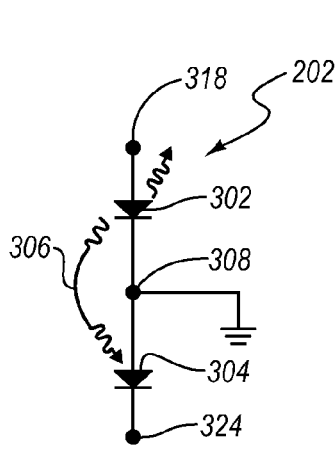
FIG. 3A illustrates a schematic diagram of an integrated VCSEL-Photodiode.
Figure 3B:
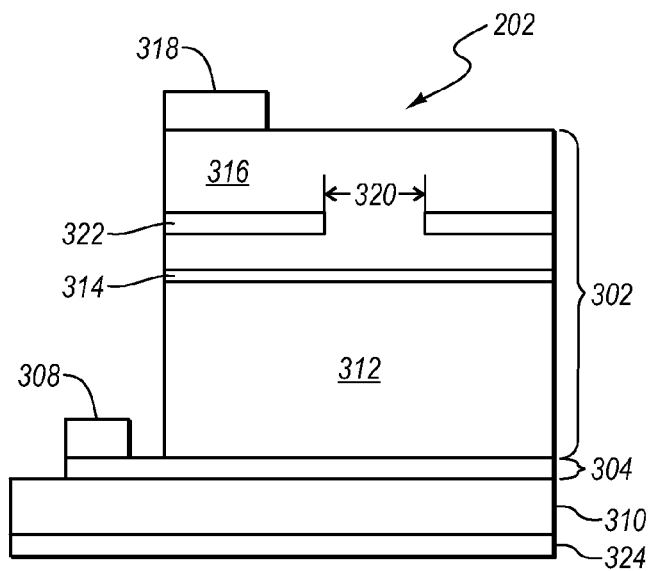
FIG. 3B illustrates a cut-away view of a processed epitaxial structure forming an integrated VCSEL-Photodiode.

Referring now to FIGS. 3A and 3B, an example of an integrated VCSEL-Photodiode 202 is illustrated. As illustrated in FIG. 3A, a VCSEL 302 is coupled optically (as illustrated at 306) and electrically to a monitor photodiode 304. The monitor photodiode 304 may be used to detect a pulse reflection in the case of OTDR or changes in the VCSEL 302 output in the case of OFDR.

FIG. 3B illustrates that the particular integrated VCSEL photodiode is formed from a single epitaxial structure on a common substrate. In particular, the monitor photodiode 304 is formed on a wafer substrate 310. Notably, the epitaxial structure illustrated in FIG. 3B is not to scale, but rather scaled for convenience of explanation and ease of illustrating features. The substrate 310 may be for example, a Gallium Arsenide wafer or other suitable material.

FIG. 3B further illustrates the VCSEL 302 formed on the monitor photodiode 304. The VCSEL 302 includes a bottom mirror 312 constructed on the monitor photodiode 304. Typically, the bottom mirror 312 includes a number of alternating high and low index of refraction layers. As light passes from a layer of one index of refraction to another, a portion of the light is reflected. By using a sufficient number of alternating layers, a high percentage of light can be reflected by the mirror.

An active region 314 that includes a number of quantum wells is formed on the bottom mirror. The active region 314 forms a PN junction sandwiched between the bottom mirror 312 and a top mirror 316, which are of opposite conductivity type (i.e. a p-type mirror and an n-type mirror). Free carriers in the form of holes and electrons are injected into the quantum wells when the PN junction is forward biased by an electrical current applied at contacts 318 and 308. At a sufficiently high bias current the injected minority carriers, electrons and holes, form a population inversion in the quantum wells that produces optical gain. Optical gain occurs when photons in the active region cause electrons to transfer from the conduction band to the valence band which produces additional photons. When the optical gain is equal to the loss in the two mirrors, laser oscillation occurs. The free carrier electrons in the conduction band quantum well are stimulated by photons to recombine with free carrier holes in the valence band quantum well. This process results in the stimulated emission of photons, and produces coherent light.

The active region may also include an oxide aperture 320 formed using one or more oxide layers 322 formed in the top and/or bottom mirrors near the active layer. The oxide aperture 320 serves both to form an optical cavity and to direct the bias current through the central region of the cavity that is formed.

A top mirror 316 is formed on the active region. The top mirror 316 is similar to the bottom mirror 312 in that it generally comprises a number of layers that alternate between a high index of refraction and a lower index of refraction. Generally, the top mirror has fewer mirror periods of alternating high index and low index of refraction layers, to enhance light emission from the top of the VCSEL 302. Various examples of integrated VCSEL-Photodiodes can be found in previously filed application LIGHT EMITTING DEVICE WITH AN INTEGRATED MONITOR PHOTODIODE Ser. No. 10/877,915 Filing Date: Jun. 25, 2004 which is incorporated herein by reference.

Figure 4:
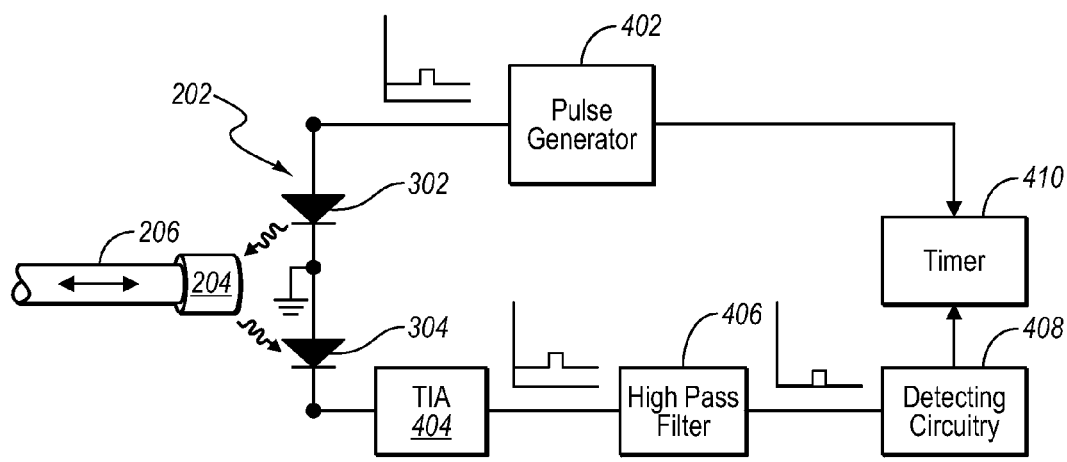
FIG. 4 illustrates an Optical Time Domain Reflectometry application using an integrated VCSEL-Photodiode.

Referring now to FIG. 4, an example of an OTDR application of an integrated VCSEL-Photodiode 202 is illustrated. The VCSEL-Photodiode 202 is coupled through a coupler, such as the fiber coupler 204 to a waveguide, such as the optical fiber 206. The optical fiber 206 may have occurrences along the length of the fiber, such as defects in the fiber itself, cracks in the fiber, breaks in the fiber, bends in the fiber, something external to the fiber, etc, that affect the performance of the fiber. Each of these occurrences will cause reflections which may result in loss of signal and/or interference.

FIG. 4 illustrates that a pulse generator is connected to the anode of the VCSEL 302. The pulse generator 402, in this particular example, is configured to generate a short electrical pulse which causes the VCSEL 302 to emit a short optical pulse. Several factors may be considered when determining the characteristics of the electrical pulse generated by the generator 402. For example, when a pulse is generated, because of the connection of the photodiode 304 to the VCSEL 302, ringing will occur in the photodiode 304. In other words, a decaying oscillating signal will be detected by the photodiode 304. As such, if multiple pulses are generated, it may be beneficial to allow the ringing to decay to a point where it becomes negligible or to a point where it can be discriminated against compared to a detected reflection before emitting another pulse. Additionally, because of the ringing, it may be desirable to test waveguides, such as the fiber 206, which have occurrences at a sufficient distance along the waveguide to allow the ringing to decay to suitable level before a reflection is received. For example, one embodiment in an 850 nm VCSEL application may use a VCSEL pulse that is about 500 picoseconds long with a 20 mA pulse and a duty cycle of less than 0.1%. The duty cycle is a ratio of pulse length to time between pulses. Of course there is significant variation in the embodiments that may be implemented, and the preceding values are merely exemplary.

In one embodiment, the pulse generator may supply a somewhat constant DC signal to the VCSEL 302 and the pulse may be an increase or decrease in the value of the DC signal. By using a constant DC signal that holds the VCSEL 302 just at or above threshold, the VCSEL 302 reaction speed can be optimized. However, in some embodiments where slower reactions are acceptable, no DC bias current may be used which may have the benefit of reducing power consumption of a test device incorporating the circuitry.

The optical pulse is emitted by the VCSEL 302 and propagated onto the fiber 206. An occurrence along the length of the fiber will result in all or a portion of the pulse being reflected back towards the VCSEL-Photodiode 202. Notably, the VCSEL photodiode may be designed such that the VCSEL 302 is transparent at the wavelength of light emitted by the VCSEL 302. As such, in the particular example, the reflection will pass through the VCSEL 302 to photodiode 304. The reflection will be detected by the photodiode 304 which will cause an electrical pulse to be generated from the photodiode 304. The electrical pulse can be detected an amplified by a transimpedance amplifier (TIA) 404. As illustrated in FIG. 4 and with reference to FIGS. 3A and 3B as well, the TIA 404 is connected to the cathode of the photodiode at a contact 324.

In the example illustrated, the VCSEL 302 is biased at just above threshold. As such some spontaneous optical emissions other than the pulse occur. This results in a DC bias of an electrical signal output by the TIA 404. This DC bias can be removed by passing the signal from the TIA 404 through a high pass filter 406 to filter out the DC bias. The high pass filter 406 also helps to reduce noise. A filtered signal can then be delivered to a detecting circuit 408. For example, the detecting circuit may be a threshold detection circuit that detects when a signal at or above a particular strength is received.

FIG. 4 further illustrates a timer 410. The timer 410 can be notified by the pulse generator 402 when a pulse is generated and can be notified by the detecting circuitry when a reflection is received. Thus, the timer can provide information about the time between when a pulse is generated and when a reflection is received. The time can be correlated to the distance to the occurrence of interest. For example, knowing the time between when a pulse is generated and when a reflection is received, the wavelength of the pulse and some characteristics of the fiber 206, a distance can be calculated where the distance is the distance where the reflection occurred. As the reflection is caused by an occurrence along the length of the fiber 206, the distance of the occurrence can be determined exactly or determined at least approximately from the calculation as well. Notably other correlation methods may also be included such as reference to a look-up table, or any other suitable method.

While the present OTDR example is illustrated using an 850 nm VCSEL, other wavelengths may be implemented as well. For example, 1310 nm and 1550 nm integrated VCSEL-Photodiodes may be implemented. Additionally, the wavelength does not necessarily need to be matched to the optical waveguide being analyzed. In particular, acceptable length measurement may be possible with VCSELs wavelength mismatched to the fiber, and with fibers that are either multimode or single mode at the VCSEL wavelength.

Figure 5:
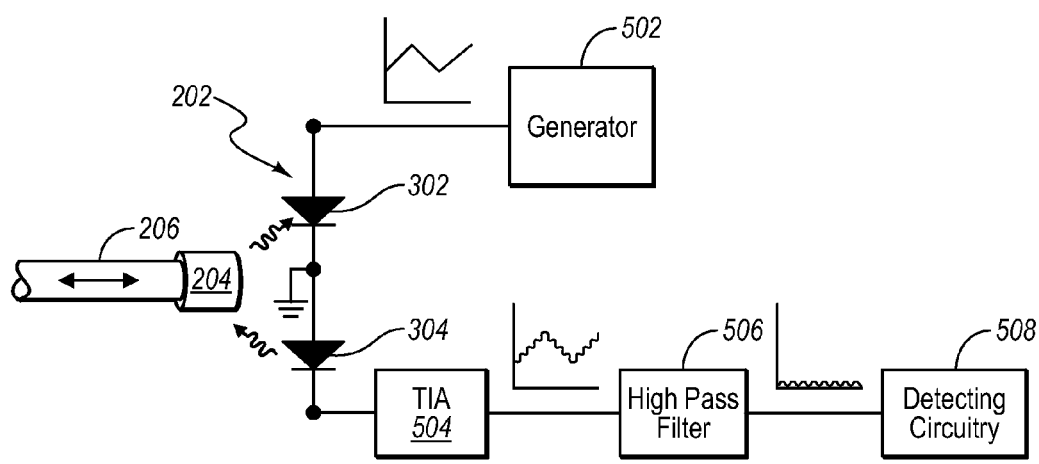
FIG. 5 illustrates an Optical Frequency Domain Reflectometry application using an integrated VCSEL Photodiode.

Referring now to FIG. 5, an example of an OFDR application using the integrated VCSEL-Photodiode 202 is illustrated. In the example illustrated, the VCSEL-Photodiode 202 is optically coupled through a coupler, such as the fiber coupler 204 to an optical waveguide, such as the fiber 206. As in the OTDR example, occurrences along the length of the fiber 206 will cause reflections of an emitted optical signal.

FIG. 5 illustrates a generator 502. The generator 502 emits an electrical signal that modulates the VCSEL 302. The VCSEL 302 and generator 502 are designed and configured such that the generator 502 is able to modulate the wavelength of the VCSEL 302. In one embodiment, this is accomplished by modulating the current through the VCSEL 302. Increasing the current in the VCSEL 302 causes the VCSEL to increase in operating temperature. The increase in operating temperature causes a corresponding change in the wavelength output by the VCSEL. Additionally, the VCSEL can be optimized to be more thermally sensitive to changes in current. For example, and referring to FIG. 3B, the top mirror 316 and/or bottom mirror 312 may be designed to be more resistive than in a typical VCSEL such that additional heating occurs as more current is applied. The oxide layers 322 may be grown to create a smaller aperture 320 which results in higher resistivity of the VCSEL and increased heating with increased current. Other enhancements may also be implemented as illustrated in United States patent applications VERTICAL CAVITY SURFACE EMITTING LASER OPTIMIZED FOR OPTICAL SENSITIVITY Ser. No. 11/118,159 filed Apr. 29, 2005, VERTICAL CAVITY SURFACE EMITTING LASER WITH OPTIMIZED LINEWIDTH ENHANCEMENT FACTOR, Ser. No. 11/117, 786, filed on Apr. 29, 2005 and VERTICAL CAVITY SURFACE EMITTING LASER OPTIMIZED FOR THERMAL SENSITIVITY, Ser. No. 11/093,240, filed on Mar. 29, 2005, each of which is incorporated herein by reference.

FIG. 5 illustrates a ramped modulation signal being emitted by the generator 502. In the particular embodiment shown, the wavelength does not need to be widely modulated. Similarly, the driving signal from the generator 502 does not need to be widely modulated. While the signal shown includes a constant DC bias, and the signal is by no means to scale, the peak to peak ramp portion of the signal generated by the generator may be in the milliamp or microamp range. In particular, only a small wavelength modulation is used in the present example. The frequency in the present example may be in the kHz range. While the ramped modulation signal is particularly useful, other embodiments may modulate wavelength of the VCSEL 302 using other modulation waves.

With continued attention to FIG. 5, a wavelength modulated optical signal from the VCSEL is propagated onto the fiber 206. An occurrence along the length of the fiber may cause at least or portion of the signal to be reflected depending on the wavelength of the emitted optical signal. At this point, it should be noted that "along the length of a waveguide" can be interpreted in the context of this disclosure to include occurrences that might be slightly beyond the actual waveguide itself. Along the length of a waveguide may include an occurrence at the end of the fiber either due to a fiber break or connector connected to the fiber. For example, a connector may cause a reflection at a point slightly beyond the actual length of the waveguide. However, the connector should be considered to be along the length of the waveguide in this context if not otherwise distinguished.

Returning once again to FIG. 5, the occurrence along the length of the fiber essentially becomes part of an external mirror of the VCSEL 302 and changes the output wavelength of the VCSEL 302. This occurs because of an effective change in the reflectivity of the external mirror at the wavelength that reflections occur. Notably, occurrences along the length of the fiber that are at even integral ¼ wavelength multiples result in peaks of the VCSEL output and occurrences that are at odd integral ¼ wavelength multiples result in valleys of the VCSEL output. Increases in reflectivity of an external mirror at a given wavelength result in a decrease in threshold for the VCSEL at that wavelength and an increase in the slope efficiency of the bottom mirror.

The photodiode 304 is thus able to monitor the output of the VCSEL 302 and produce electrical signals which are proportional to the optical signals received. Thus, peaks and valleys caused by effectively changing the cavity of the VCSEL 302 are detected by the photodiode 304 and converted to a corresponding electrical signal. This electrical signal is provided to a TIA 504 where it is amplified into a form such as that illustrated between the TIA 504 and the high pass filter 506. The signal is fed into the high pass filter 506 to remove the modulated bias that occurs due to the wavelength modulating signal provided by the generator 502. The filtered signal is then fed into analyzing circuitry 508 which can be used to determine the distance to an occurrence along the length of the fiber 206. Changes in the output of the VCSEL 302 can be correlated to a distance.

In one embodiment, the analyzing circuit 508 may include fast Fourier transform (FFT) circuitry. This circuitry provides a spectral interpretation of the filtered signal. In essence, the filtered signal will have a dominant frequency, normalized to the wavelength modulating signal output by the generator 502, which is proportional to the number of wavelengths along the fiber for a given wavelength at which an occurrence causing reflections is located. If only a single occurrence is being detected, the circuitry coupled to the FFT circuitry can be quite simple to determine a distance. In essence, the distance can be calculated knowing the normalized frequency of the filtered signal and the wavelength at which the normalized signal occurred.

In an alternative embodiment, the analyzing circuitry 508 may include a counter which counts the number of peaks of the filtered signal from the high pass filter 506. Because one peak will occur for each wavelength, the number of wavelengths can be determined from the number of counted peaks. Knowing the number of wavelengths, and the wavelength at which that number occurred can be used to determine a distance along the length of the fiber.

Notably, as explained previously, combinations of tests may be performed using much of the same circuitry and optical components. In particular both OTDR and OFDR measurements may be taken using a test apparatus that includes a single integrated VCSEL-Photodiode. In one embodiment, a pulse generator and modulating generator may be selectively coupled to the VCSEL. This allows for a user or automated test system to select one of the generators for performing a test. For example, the pulse generator may be selected for an OTDR test while the modulating generator may be selected for OFDR. Similarly, a timer or analyzing circuitry may be selectively coupled to the photodiode. This allows selection of the timer circuitry for OTDR and analyzing circuitry for OFDR.

As explained previously, the test apparatus may be used for a number of different test scenarios. For example, the test apparatus may be user configured to perform one of an OTDR test or an OFDR test. In another embodiment, both OTDR and OFDR tests can be performed sequentially such that the most appropriate results can be achieved. In some embodiments, it may be possible to perform testing simultaneously. However, additional analyzing circuitry may be required to evaluate signals received at the photodiode.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of testing an optical waveguide to determine a distance in the optical waveguide to an occurrence of interest, the method comprising:

at a VCSEL, emitting a wavelength modulated optical signal into a waveguide;

receiving at the VCSEL a reflection of the wavelength modulated optical signal, wherein the reflection is caused by an occurrence of interest affecting the waveguide at a particular wavelength and wherein the reflection being received at the VCSEL causes a change in the VCSEL output;

detecting the change in the VCSEL output;

correlating the change in VCSEL output to a distance in the waveguide, wherein the distance is, at least approximately, a distance to the occurrence of interest; and determining the distance in the optical waveguide to the occurrence of interest based on the correlation of the change in VCSEL output to the distance in the waveguide.

2. The method of claim 1, wherein detecting the change in the VCSEL output comprises measuring a number of wavelengths or partial wavelengths within the waveguide.

3. The method of claim 2, wherein measuring a number of wavelengths comprises using counter circuitry to measure peaks of the changed VCSEL output.

4. The method of claim 3, wherein correlating the change in VCSEL output to a distance in the waveguide comprises calculating a distance based on a factor of the number of peaks and the wavelength of the changed VCSEL output.

5. The method of claim 2, wherein measuring a number of wavelengths comprises calculating a distance based on a dominant frequency in the spectrum and the wavelength of the changed VCSEL output.

6. The method of claim 5, wherein calculating a distance based on a dominant frequency in the spectrum and the wavelength of the changed VCSEL output comprises using fast Fourier transform (FFT) circuitry to measure the spectrum.

7. The method of claim 1, wherein detecting the change in the VCSEL output comprises detecting optical signals at a photodiode fabricated in the same epitaxial structure as the VCSEL.

8. The method of claim 1, further comprising modulating the VCSEL with a current that is modulated in a milliamp range to accomplish emitting a wavelength modulated optical signal.

9. The method of claim 1, further comprising modulating the VCSEL with a current that is modulated in a microamp range to accomplish emitting a wavelength modulated optical signal.

10. The method of claim 1, wherein the modulated optical signal is modulated using a ramped current.

11. A method of testing an optical waveguide to determine a distance in the optical waveguide of an occurrence of interest, the method comprising:

at a VCSEL, emitting an optical pulse into a waveguide;

receiving at a photodiode disposed in the same epitaxial structure as the VCSEL a reflection of the pulse such that the reflection of the pulse passes through the VCSEL and onto the photodiode, wherein the reflection is caused by an occurrence of interest affecting the waveguide;

measuring an amount of time between when the pulse was emitted and when the reflection was received;

correlating the amount of time to a distance in the waveguide, wherein the distance is, at least approximately, a distance to the occurrence of interest;

at the VCSEL, emitting a wavelength modulated optical signal into the waveguide;

receiving at the VCSEL a reflection of the wavelength modulated optical signal, wherein the reflection is caused by the occurrence of interest affecting the waveguide at a particular wavelength and wherein the reflection being received at the VCSEL causes a change in the VCSEL output;

detecting the change in the VCSEL output;

correlating the change in VCSEL output to a distance in the waveguide, wherein the distance is, at least approximately, a distance to the occurrence of interest; and determining the distance in the optical waveguide to the occurrence of interest based on the correlation of the change in VCSEL output to the distance in the waveguide or based on the correlation of the amount of time to the distance in the waveguide.

12. The method of claim 11, wherein correlating the amount of time to a distance in the waveguide comprises using characteristics of the waveguide and the wavelength of the pulse to calculate a distance.

13. The method of claim 11, wherein emitting an optical pulse comprises emitting a pulse with a width and a duty cycle which allows ringing in the photodiode to decay to an acceptable level.

14. The method of claim 11, further comprising biasing the VCSEL with a DC signal to decrease the response time of the VCSEL.

15. The method of claim 11, wherein the optical pulse does not include a DC component to decrease energy consumption of a test device implementing the method.

16. A test apparatus configured to test for occurrences of interest along an optical waveguide, the test apparatus comprising:

a VCSEL;

a pulse generator coupled to the VCSEL configured to cause the VCSEL to emit an optical pulse into a waveguide;

a photodiode disposed in the same epitaxial structure as the VCSEL;

a timer communicatively coupled to the VCSEL and the photodiode, wherein the timer is configured to measure an amount of time between when a pulse is emitted by the VCSEL and when a reflection of the pulse passes through the VCSEL and onto the photodiode, wherein the reflection is caused by an occurrence of interest affecting the waveguide;

a modulating generator selectively coupled to the VCSEL, the modulating generator configured to modulate the wavelength of the VCSEL, and wherein the pulse generator is selectively coupled to the VCSEL such that a generator is selectively coupled to the VCSEL; and analyzing circuitry selectively coupled to the photodiode, the analyzing circuitry configured to detect changes in the VCSEL output and wherein the timer is selectively coupled to the photodiode such that either the analyzing circuitry or the timer circuitry can be operatively coupled to the photodiode.

* * * * *